March 31, 1959  P. H. SAVET  2,879,941
TRIANGLE COMPUTER
Filed March 10, 1953
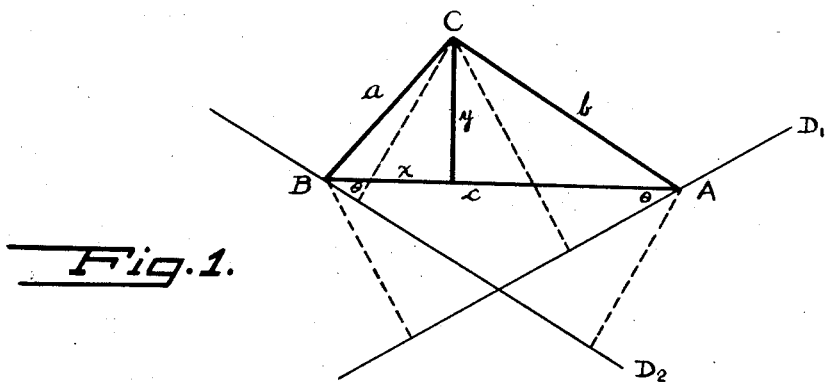
Fig. 1.
Fig. 2.
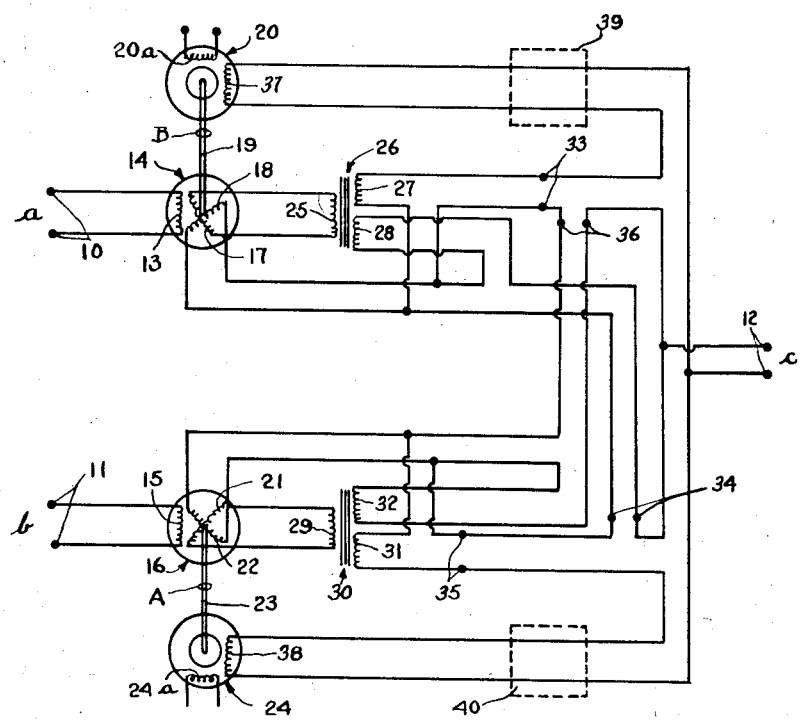
INVENTOR.
PAUL H. SAVET
BY
*Raymond A. Paquin*
ATTORNEY.

United States Patent Office 2,879,941
Patented Mar. 31, 1959

2,879,941

TRIANGLE COMPUTER

Paul H. Savet, Oceanside, N.Y., assignor to American Bosch Arma Corporation, a corporation of New York Application March 10, 1953, Serial No. 341,428

3 Claims. (Cl. 235—186)

This invention relates to electro-mechanical computing systems, and has particular reference to solution of triangles when three sides are known.

In a triangle having sides $a$, $b$ and $c$ and angles A, B and C it is often desired to know the length of the altitude of the triangle (from C to $c$) and the distances into which the base $c$ is divided by the altitude. By usual methods equations can be set up which give a mathematical solution, but the instrumentation of these equations may lead to undesirable performance of the electro mechanical elements, or may result in an entirely inoperative instrument under certain conditions. The present invention proposes a different mathematical solution which is more readily instrumented. At the base of the triangle a pair of lines inclined to the base at the same angle may be drawn. The projections of the three sides of the triangle on each of these lines must add up to zero, thereby giving a pair of simultaneous equations whose instrumentation can be easily performed.

For a better understanding of the invention reference may be had to the accompanying diagrams, in which, Figure 1 is a diagram of the geometry of the problem to be solved; and Figure 2 is a schematic wiring diagram of the instrument of this invention.

With reference now to Figure 1, it is desired to find the altitude $y$ and the distance $x$ along the base where the altitude intersects the base, $c$, in the triangle ABC whose sides $a$, $b$, and $c$ are known. In the usual calculation of this kind the equations $$a \sin B - b \sin A = 0 \text{ and} \quad (1)$$

$$a \cos B + b \cos A - c = 0 \quad (2)$$

are solved. However, since sin (180—K) is equal to sin K, the instrumentation of Equation 1 will result in unstable servo motor operation. In order to avoid this possibility the solution of the problem is made in the following fashion: At A and B lines $D_1$ and $D_2$, inclined to the base by a constant angle of $\theta$ degrees, are drawn. The sum of the projection of $a$, $b$, and $c$ on each of lines $D_1$ and $D_2$ must be zero. Thus:

$$a \cos (B+\theta) + b \cos (A-\theta) - c \cos \theta = 0 \quad (3)$$

$$a \cos (B-\theta) + b \cos (A+\theta) - c \cos \theta = 0 \quad (4)$$

Equations 3 and 4 may be modified by expanding the trigonometric terms, into the following:

$$a \cos B \cos \theta - a \sin B \sin \theta + b \cos A \cos \theta$$
$$+ b \sin A \sin \theta - c \cos \theta = 0 \quad (5)$$

$$a \cos B \cos \theta + a \sin B \sin \theta + b \cos A \cos \theta$$
$$- b \sin A \sin \theta - c \cos \theta = 0 \quad (6)$$

Dividing 5 and 6 by $\cos \theta$, $$a \cos B - a \sin B \tan \theta + b \cos A + b \sin A \tan \theta - c = 0 \quad (7)$$

$$a \cos B + a \sin B \tan \theta + b \cos A - b \sin A \tan \theta - c = 0 \quad (8)$$

The circuit shown in Fig. 2 is used to solve the triangle ABC according to the Equations 7 and 8. The sides $a$, $b$, and $c$, being known, are represented by proportional voltages which are made available at terminals 10, 11, and 12 respectively.

In this description the phrase "proportional to" when applied to a voltage or shaft displacement is intended to indicate that the magnitude of the voltage or the shaft displacement from its zero position is proportional to the magnitude of a quantity, and that the phase or direction of shaft displacement from its zero position changes with a change of sign of the quantity.

The diagram of Fig. 2 is schematic and shows the electrical connections between the major elements of the operative circuit. For simplicity, the usual amplifiers, damping devices, phase shifters and other similar items which are required and whose operation and necessity is well known to those in the art have been omitted from the diagram and description.

The primary winding 13 of resolver 14 is energized by the "$a$" voltage at terminals 10, and the primary winding 15 of resolver 16 is energized by the "$b$" voltage at terminals 11. The secondary windings 17 and 18 of resolver 14 are angularly displaced with respect to the primary winding 13 by shaft 19 which is driven by motor 20. Similarly, secondary windings 21 and 22 of resolver 16 are displaced with respect to the primary winding 15 by shaft 23 which is driven by the motor 24. Assuming that the displacement of shaft 19 is $\beta$, then the output voltages of secondary windings 17 and 18 are respectively proportional to $a \sin \beta$ and $a \cos \beta$. The output of secondary winding 17 energizes the primary winding 25 of transformer 26 which has a constant ratio of transformation between its primary winding 25 and each of the secondary windings 27 and 28. This transformation ratio is proportional to $\tan \theta$ of Equations 7 and 8 so that the output of each secondary winding 27 and 28 is proportional to $a \sin \beta \tan \theta$.

Also, assuming that the displacement of shaft 23 is $\alpha$, then the output voltages of secondary windings 21 and 22 are proportional to $b \sin \alpha$ and $b \cos \alpha$ respectively. The output of secondary winding 21 energizes the primary winding 29 of transformer 30 in which a constant ratio of transformation exists between the primary winding 29 and the secondary windings 31 and 32 such that the output of each secondary winding 31 and 32 is proportional to $b \sin \alpha \tan \theta$.

Secondary winding 18 is connected in series with secondary winding 27 of transformer 26 to produce a voltage proportional to $a \cos \beta + a \sin \beta \tan \theta$ at terminals 33. Secondary windings 28 and 18 are connected in series to produce a voltage proportional to $a \cos \beta - a \sin \beta \tan \theta$ at terminals 34. Similarly voltages proportional to $b \cos \alpha + b \sin \alpha \tan \theta$ and $b \cos \alpha - b \sin \alpha \tan \theta$ are made available at terminals 35 and 36 respectively by connecting secondary windings 22 and 31 in series with terminals 35 and by connecting secondary windings 22 and 32 in series with terminals 36.

Terminals 33 and 36 are connected in series with terminals 12 and with the control field winding 37 of motor 20 in such a way that the voltage energizing control field winding 37 is proportional to $a \cos \beta + a \sin \beta \tan \theta + b \cos \alpha - b \sin \alpha \tan \theta - c$. Also, terminals 34 and 35 are connected in series with terminals 12 and with the control field winding 38 of motor 20 in such a way that the voltage energizing control field winding 38 is proportional to $a \cos \beta - a \sin \beta \tan \theta + b \cos \alpha + b \sin \alpha \tan \theta - c$. In practice, amplifiers 39 and 40 may be interposed in the connections to control field windings 37 and 38 respectively.

Motors 20 and 24 are preferably two phase induction motors whose main field windings 20$a$ and 24$a$ are energized by a constant A.C. voltage, and in which the voltage energizing the control field windings 37 and 38 are in quadrature with the main field excitation.

Motor 20 therefore is energized to drive the shaft 19 and rotor windings of resolver 14 toward the position where the excitation of control field winding 37 is zero, which is where $$a \cos \beta + a \sin \beta \tan \theta + b \cos \alpha - b \sin \alpha \tan \theta - c = 0 \quad (9)$$

Similarly motor 24 is energized to drive the shaft 23 and rotor windings of resolver 16 toward the position where the excitation of control field winding 38 is zero, which is where $$a \cos \beta - a \sin \beta \tan \theta + b \cos \alpha + b \sin \alpha \tan \theta - c = 0 \quad (10)$$

Comparison of Equations 9 and 10 with Equations 7 and 8 shows that when motors 20 and 24 are deenergized, the displacement of shaft 19 is proportional to B and the displacement of shaft 23 is proportional to A. In this condition, the triangle ABC is solved and the distances $x$ and $y$ are directly available at the outputs of secondary windings 17 and 18.

I claim:

1. In an electromechanical triangle computing system, three input signals, each corresponding to one of the triangle sides a pair of resolvers each having an input winding and a pair of output windings, said input windings being severally energized by two of said input signals, modifying means connected to one output of one of said resolvers for multiplying said output according to a constant, said modifying means having a pair of outputs, second modifying means connected to one output of the other of said resolvers and having a pair of outputs, separate motive means for driving each of said resolvers, series electrical connections between the other output of said one resolver one output of both modifying means, the other output of said other resolver the third input signal and one of said motive means for controlling the displacement of said one resolver and second series connections between the other output of said one resolver, the other outputs of both modifying means, the other output of the other resolver, the third input signal and the other of said motive means for controlling the displacement of the other resolver.

2. The invention of claim 1 wherein the modifying means employed are transformers with the same transformation ratio in both transformers.

3. In a device of the character described, three inputs, each corresponding to one side of a triangle, a pair of resolvers severally energized by two of said inputs, and each having a pair of output windings, a pair of transformers each having a primary winding and a pair of secondary windings, the primary windings of said transformers each being connected to one output of each resolver, motive means for each of said resolvers, series connections between the other output windings of said resolvers, one of the secondary windings of each of said transformers, said third input and one of said motive means, and second series connections between the said other output windings of said resolvers, the other secondary winding of each of said transformers, said third input and the other of said motive means.

References Cited in the file of this patent

UNITED STATES PATENTS

| 2,596,472 | Ergen | May 13, 1952 |
| 2,598,250 | Gehman | May 27, 1952 |
| 2,623,692 | Bedford et al. | Dec. 30, 1952 |
| 2,750,545 | Davis | June 12, 1956 |

OTHER REFERENCES

Electronic Instruments (Greenwood, Holdam and MacRae), published by McGraw-Hill Book Company, New York, 1948, page 161.

Some Aspects of Electrical Computing (Bell), Electronic Engineering, July 1951, page 265.